May 20, 1969     P. J. CLARKE     3,444,952
SKIRT RESTORING MEANS FOR GAS-CUSHION VEHICLES
Filed March 16, 1967     Sheet 1 of 2
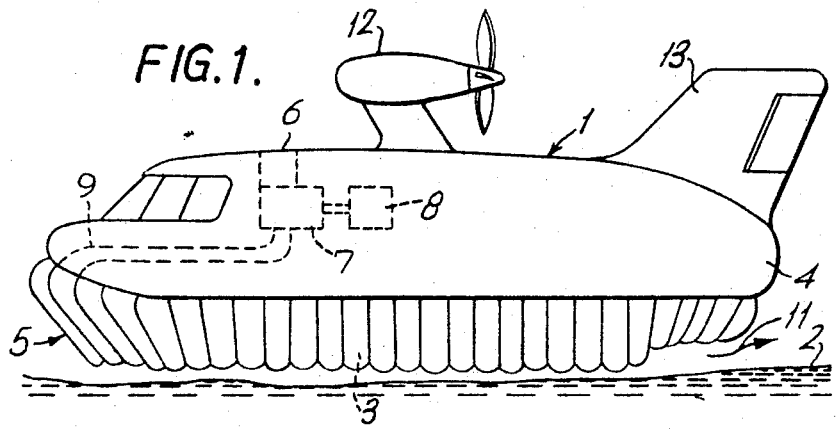
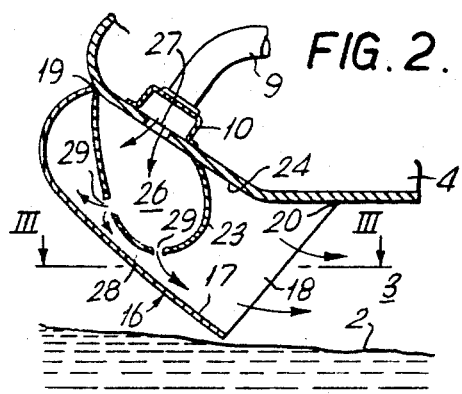 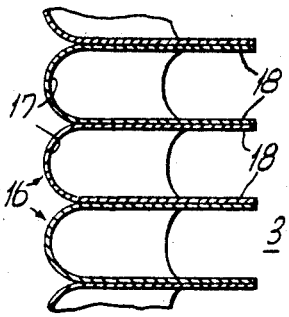
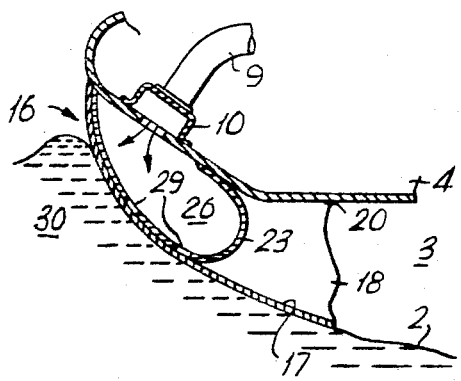
INVENTOR
P. J. CLARKE
BY
Cameron, Kerkam & Sutton
ATTORNEYS May 20, 1969      P. J. CLARKE      3,444,952
SKIRT RESTORING MEANS FOR GAS-CUSHION VEHICLES
Filed March 16, 1967      Sheet 2 of 2

INVENTOR
P. J. CLARKE
BY
Cameron, Kerkam & Sutton
ATTORNEYS ns patent office
3,444,952
Patented May 20, 1969

3,444,952
SKIRT RESTORING MEANS FOR GAS-CUSHION VEHICLES
Peter John Clarke, Southampton, England, assignor to Hovercraft Development Limited, London, England, a British company
Filed Mar. 16, 1967, Ser. No. 623,767
Claims priority, application Great Britain, Mar. 30, 1966, 14,131/66
Int. Cl. B60v 1/16, 3/00
U.S. Cl. 180—127                                11 Claims

ABSTRACT OF THE DISCLOSURE

A gas-cushion vehicle for operation over water wherein at least the front end of the cushion is contained by a flexible skirt. To prevent "plough-in" of the vehicle caused by drag loads on the skirt, an inflated bladder is disposed between the skirt and the vehicle body so that inward deflection of the skirt is resisted by resilience of the bladder.

---

Figure 6:
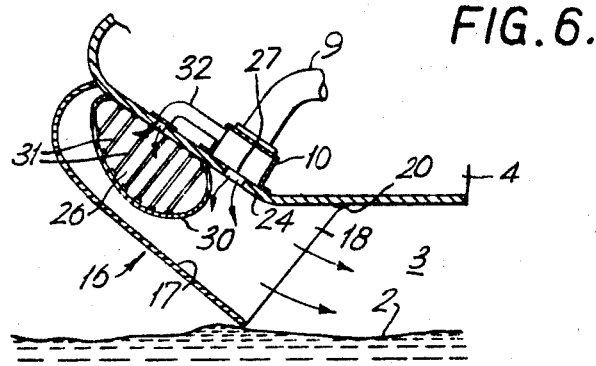

This invention relates to gas-cushion vehicles, that is to say, to vehicles for travelling over a surface which, in operation, are supported at least in part by a cushion of pressurized gas (usually air) formed and contained beneath the vehicle body, and the invention is concerned with gas-cushion vehicles of the type wherein the front end of the vehicle-supporting cushion is contained, at least in part, by a flexible wall structure depending from the vehicle body.

When travelling over water under certain operating conditions, for example, over a series of waves, it has been found that successive contact between the front-disposed wall structure and the waves gives rise to large leaks of cushion gas which, combined with increasing drag forces, can build up to pull the front of the vehicle downwardly on to the water.

What happens is that initial contact between the front-disposed wall structure and a wave causes inward deflection of the wall structure allowing a loss of gas from the cushion which momentarily exceeds that supplied to the cushion space and this results in downward movement of the front of the vehicle body. Contact between the wall structure and the next wave of the series causes a further loss of gas from the cushion and a further downward movement of the vehicle front, the action being progressive from wave to wave.

It has been found that this effect can be substantially countered by applying a restoring force to a deflected wall structure, this force being in excess of that inherently applied by cushion pressure and which accelerates restoration of the deflected wall structure whereby loss of cushion gas by deflection is substantially reduced.

According to the invention, a gas-cushion vehicle wheerin the front end of the vehicle-supporting cushion is contained, at least in part, by a flexible wall structure depending from the vehicle body and inflatable to conform to a desired shape, is provided with means for applying to the wall structure a restoring force accelerating restoration of the wall structure after substantial inward deflection thereof, said means comprising an inflatable chamber disposed between the wall structure and the vehicle body, the chamber being constructed and arranged so that substantial inward deflection of the wall structure compresses said chamber whereby said wall structure tends to be restored to its original position by resilience of said chamber.

According to one form of the invention, the inflatable chamber is attached to the vehicle body and is provided with gas inlet means for providing a continuous supply of inflation gas to the chamber and gas outlet means for allowing an out-flow of gas from said chamber to the interior of the wall structure, the gas outlet means facing forwardly of the vehicle so that substantial inward deflection of the wall structure impedes outflow of gas from the chamber whereby resilience of the chamber results from gas pressure build-up within said chamber.

According to another form of the invention, the inflatable chamber comprises an inflated bladder attached to a front portion of the wall structure adjacent part of the vehicle so that, on substantial inward movement of said wall structure, the bladder is compressed between the wall structure and the vehicle body.

Alternativelly, the bladder referred to in the preceding paragraph is attached to the front of the vehicle body instead of to the wall structure.

In all forms of the invention, the front portion of the wall structure may comprise a succession of contiguous wall members movable relative to each other, each wall member being provided with an inflatable chamber.

Further, in all forms of the invention, compression of the inflatable chamber is preferably arranged to result in substantial flattening of the chamber, or at least parts thereof, whereby the restoring force acts over a substantial area.

Figure 5:
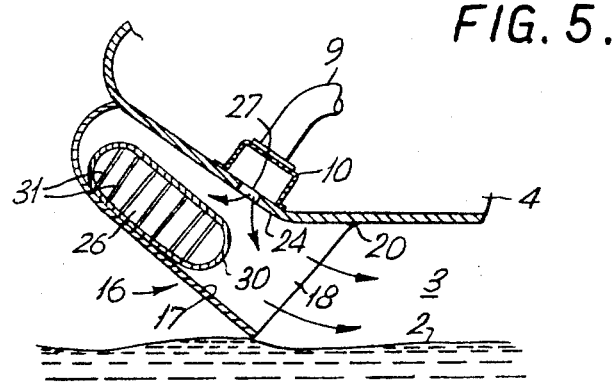

An embodiment of the invention will now be described by way of example with reference to the accompanying drawings wherein:

FIGURE 1 is a side view of a gas-cushion vehicle,
FIGURE 2 is a detail, to an enlarged scale and partly in section, of the front end portion of the vehicle shown in FIGURE 1 with its associated flexible wall structure in one operative position,
FIGURE 3 is a section taken on the lines III—III of FGURE 2,
FIGURE 4 is a detail similar to FIGURE 2 and shows the flexible wall structure in another operative position, and
FIGURES 5 and 6 are views somewhat similar to that of FIGURE 2 and illustrate modifications thereof.

With reference to FIGURES 1 and 2, a gas-cushion vehicle 1 is supported above the surface 2 of water by a cushion 3 of pressurized air formed beneath the vehicle body 4 and contained thereunder by a flexible wall structure 5 depending from the vehicle body and extending around the periphery thereof. The vehicle 1 is of the so-called "plenum-chamber" type, ambient air being drawn in through an intake 6 by a compressor 7 driven by an engine 8 and discharged to the space occupied by the cushion 3, by a duct 9 and distribution manifold 10. Air surplus to cushion-forming requirements escapes rearwardly to atmosphere through a gap between the bottom of the rear part of the wall structure 5 and the water surface 2 beneath, as indicated by the arrow 11. The front and side parts of the wall structure 5 are normally in light contact with the water surface 2, as shown in FIGURE 2. The vehicle is propelled by a swivel-mounted airscrew propeller unit 12 and is provided with a stabilising and control rudder unit 13.

The flexible wall structure 5 is of the type described and claimed in British Patent 1,043,351 that is, it comprises a succession of separate, flexible wall members 16 each defining a concavity 17, the hollow of which is presented towards the space occupied by the cushion, a side or tie portion 18 of each wall member being contiguous with the adjacent side portion 18 of a neighbouring wall member. Each wall member 16 is attached to the vehicle body 4 at the upper end 19 of its concavity 17 and at the innermost ends 20 of its side portions 18. The inner edges of the side portions 18 make an angle of substantially 90° with their associated concavity 17. This configuration maintains the wall members 16 in tension, when inflated, with an economic use of material.

Within the upper interior of each front-disposed wall member 16 is a flexible bag 23 attached to the front 24 of the vehicle body so as to define therewith an inflatable chamber 26 of elongated form. The chamber 26 is inflated by a continuous supply of air fed to the manifold 10 and which enters the chamber by way of one of a row of apertures 27 extending around the vehicle body front 24. The chamber 26 defines, under normal operating conditions, an elongate space 28 with the concavity 17 for a major part of the effective depth of the wall member 16, i.e. for at least half of the vertical distance between the upper extremity of the wall member and the surface 2. Chamber outlet means in the form of apertures 29 face forwardly of the vehicle 1 and allow an outward flow of air from the chamber 26 into the wall member 16 to at least assist in inflating the latter to the shape shown in FIGURE 2.

Under normal operating conditions air is supplied to the chamber 26 at a pressure about twice that of the cushion 3 and varying pressures around the bag 23 cause the bag to take up the form shown in FIGURE 2.

With reference to FIGURE 4, should the vehicle 1 encounter a wave 30 of large height (for example, a wave of above half-cushion height), contact between a wall member 16 and the wave will deflect the wall member inwardly towards the cushion 3 tending to drag the wall member onto the water surface 2. Substantial inward deflection of the wall member 16 will cause the upper part of the wall member to be flattened against an adjacent part of the chamber 26 so as to first impede air flow through the aperture 29 and thereafter compress the bag 23 so that air pressure is built-up within the chamber 26 and manifold 10 whereby the wall structure tends to be restored to its position before deflection by resilience of the bag 23. The restoring force is applied by the bag 23 along a substantial part of the wall member 16, this area being larger than the original adjacent part of the bag as the bag is flattened by compression. The area of chamber surface acted upon by the relatively high pressure build-up within the bag 23 is substantially the same as the area of contact between the wall member 16 and the bag 23 so that the restoring force accelerates restoration of the wall member 16 substantially in excess of that inherently applied by pressure of the cushion 3.

Referring now to FIGURE 5, the inflatable chamber 26 in this modification comprises an inflated bladder 30 of elongate form attached to the upper end of the concavity 17 and extending for well over one-half of the effective depth of the wall member 16. The bladder 30, which is sealed, is prevented from assuming a spherical form by internal tie-cords 31. In this modification the wall members 16 comprising the front portion of the wall structure 5 are inflated directly from the manifold 10, which is sited somewhat lower than in the embodiment of FIGURE 2.

Should the wall member 16 be deflected inwardly to a substantial degree, the wall member is restored by resilience resulting from the bladder 30 being compressed between the deflected part of the wall member and the front portion 24 of the vehicle body. As in the embodiment of FIGURE 2, compression of the inflatable chamber, or bladder, tends to flatten the bladder so that the restoring force is applied to the wall member over a substantial area.

In the further modification of FIGURE 6, the arrangement illustrated therein is identical to that of FIGURE 5 save that the bladder 30 is attached to the front portion 24 instead of to the wall member 16 and, to prevent the bladder 30 becoming too stiff after compression, the bladder is not sealed but is connected to the duct 9 by a combined vent and inflation duct 32 whereby the bladder is normally inflated to about twice cushion pressure and excess inflation pressure is relieved by a back-flow of air through the duct 32.

I claim:
1. A gas-cushion vehicle wherein the cushion is contained, at least in part, by a flexible wall structure depending from the vehicle body and comprising a sheet of flexible material the interior of which, in operation, is in substantially unobstructed communication with the cushion so as to be inflated by the cushion pressure to conform to a desired shape, and in which an inflatable chamber is disposed between the wall structure and the vehicle body, the chamber being so constructed and arranged that, in the event of substantial inward deflection of the wall structure, said chamber is compressed between the vehicle body and the wall structure so that a force is applied to said wall structure to accelerate its restoration to its original shape.

2. A vehicle as claimed in claim 1 wherein the inflatable chamber is attached to the vehicle body and is provided with gas inlet means for providing a continuous supply of inflation gas and gas outlet means for allowing an outflow of gas from said chamber, the gas outlet means being disposed so as to face the inner surface of the wall structure whereby substantial inward deflection of the wall structure impedes the outflow of gas from the chamber so that resilience of the chamber results from gas pressure build-up within said chamber.

3. A vehicle as claimed in claim 2 wherein said outflow of gas from said chamber is used to at least assist in inflating the wall structure.

4. A vehicle as claimed in claim 1 wherein said inflatable chamber comprises an inflated bladder attached to the vehicle body.

5. A vehicle as claimed in claim 4 wherein said bladder is provided with vent means for relieving excess inflation pressure.

6. A vehicle as claimed in claim 1 wherein said inflatable chamber comprises an inflated bladder attached to the wall structure.

7. A vehicle as claimed in claim 1 wherein the wall structure comprises a succession of contiguous wall members movable relative to each other.

8. A vehicle as claimed in claim 7 wherein each of said wall members define a concavity, the hollow of which is presented towards the space occupied by the vehicle-supporting cushion, a side portion of each wall member being contiguous with the adjacent side portion of a neighbouring wall member.

9. A vehicle as claimed in claim 1 wherein the inflatable chamber is normally inflated to a pressure greater than the cushion pressure.

10. A gas-cushion vehicle wherein the cushion is contained, at least in part, by a flexible wall structure depending from the vehicle body and comprising a sheet of flexible material the interior of which, in operation, is in substantially unobstructed communication with the cushion so as to be inflated by the cushion pressure to conform to a desired shape, and in which an inflatable chamber is disposed between the wall structure and the vehicle body, the chamber being so constructed and arranged that, in the event of substantial inward deflection of the wall structure, said chamber is compressed between the vehicle body and the wall structure and flattened over a substantial part of its area so that a force resulting from the build-up of chamber inflation pressure due to said compression is applied to a substantial area of said wall structure to accelerate its restoration to its original shape.

11. A vehicle as claimed in claim 10 wherein the inflatable chamber is attached to the vehicle body and is provided with gas inlet means for providing a continuous supply of inflation gas and gas outlet means for allowing an outflow of gas from said chamber, the gas outlet means being disposed so as to face the inner surface of the wall structure whereby substantial inward deflection of the wall structure impedes the outflow of gas from the chamber.

(References on following page)

References Cited

UNITED STATES PATENTS

| | | | |
|---|---|---|---|
| 3,191,705 | 6/1965 | Jones et al. | 180—126 |
| 3,339,654 | 9/1967 | Bertin et al. | 180—127 |
| 3,363,717 | 1/1968 | Hunt | 180—128 |
| 3,363,718 | 1/1968 | Hammett | 180—128 |

FOREIGN PATENTS

| | | |
|---|---|---|
| 925,425 | 5/1963 | Great Britain. |
| 1,359,375 | 3/1964 | France. |

A. HARRY LEVY, *Primary Examiner.*

U.S. Cl. X.R.

180—117